United States Patent Office 3,699,022
Patented Oct. 17, 1972

3,699,022
PHOTOPOLYMERIZABLE UNSATURATED POLYESTERS CONTAINING BENZOIN-ETHER, ORGANIC ACID ESTER, ORGANIC PHOSPHINE INITIATORS
Burkhard Behrens and Hermann Delius, Ahrensburg, Germany, assignors to Reichhold-Albert Chemie Aktiengesellschaft, Hamburg, Germany
No Drawing. Filed Jan. 29, 1971, Ser. No. 111,158
Claims priority, application Switzerland, Feb. 5, 1970, 1,626/70, 1,627/70; Jan. 5, 1971, 57/71, 58/71
Int. Cl. B01j 1/00; C08d 1/00
U.S. Cl. 204—159.15                     20 Claims

ABSTRACT OF THE DISCLOSURE

This invention relates to preparations curable by UV irradiation, such as moulding, impregnating and coating compositions, of mixtures, stabilised in the usual manner, of unsaturated polyester resins and copolymerisable, monomeric compounds and photo-initiators, which optionally additionally contain polymerisation initiators and/or metal accelerators and/or paraffin or wax or wax-like substances, characterised in that they contain, as the photo-initiator, an overall combination consisting of:

(a) benzoin-ethers, and
(b) a sub-combination of at least two different compounds of trivalent phosphorus, consisting of:
(b') organic esters of phosphorous acid of general formula

(I)

wherein $R_1$, $R_2$ and $R_3$ can be identical or different and represent aliphatic, cycloaliphatic, aromatic, araliphatic or heterocyclic radicals—but one of the radials $R_1$, $R_2$ or $R_3$ must always be an aromatic radical—and
(b'') of organic derivatives of phosphine of general formula

(II)

wherein $R_1$, $R_2$ and $R_3$ can be identical or different and represent aliphatic, cycloaliphatic, aromatic, araliphatic or heterocyclic radicals—but one of the radials $R_1$, $R_2$ or $R_3$ must always be an aromatic radical—and the percentages by weight mentioned relate to the total weight of unsaturated polyester resin and copolymerisable monomers.

The invention relates also to a process for the preparation of shaped articles, impregnations, coatings and the like, from said preparations curable by UV irradiation, such as moulding, impregnating and coating compositions, of mixtures, stabilised in the usual manner, of unsaturated polyester resins and copolymerisable, monomeric compounds and photo-initiators, which optionally additionally contain polymerisation initiators and/or metal accelerators and/or paraffin or wax or wax-like substances, characterised in that, as the photo-initiators, the said overall combination is used.

BACKGROUND OF THE INVENTION (1) Field of the invention

This invention relates to preparations curable by UV irradiation, such as moulding, impregnating and coating compositions, of mixtures, stabilised in the usual manner, of unsaturated polyester resins and copolymerisable, monomeric compounds and photo-initiators which optionally additionally contain polymerisation initiators and/or metal accelerators and/or paraffin or wax or wax-like substances, characterised in the they contain, as the photo-initiator, an overall combination consisting of:

(a) 0.1 to 4% by weight of benzoin-ethers, and
(b) a sub-combination of at least two different compounds of trivalent phosphorus, consisting of:
(b') 0.6 to 20% by weight of organic esters of phosphorous acid of general formula

(I)

wherein $R_1$, $R_2$ and $R_3$ can be identified or different and represent aliphatic, cycloaliphatic, aromatic, araliphatic or heterocyclic radicals—but one of the radials $R_1$, $R_2$ or $R_3$ must always be an aromatic radical—and
(b'') 0.05 to 2% by weight of organic derivatives of phosphine of general formula

(II)

wherein $R_1$, $R_2$ and $R_3$ can be identical or different and represent aliphatic, cycloaliphatic, aromatic, araliphatic or heterocyclic radicals—but one of the radials $R_1$, $R_2$ or $R_3$ must always be an aromatic radical—and the percentages by weight mentioned relate to the total weight of unsaturated polyester resin and copolymerisable monomers.

The invention relates also to a process for the preparation of shaped articles, impregnations, coatings and the like, from said preparations curable by UV irradiation, such as moulding, impregnating and coating compositions, of mixtures, stabilised in the usual manner, of unsaturated polyester resins and copolymerisable, monomeric compounds and photo-initiators, which optionally additionally contain polymerisation initiators and/or metal accelerators and/or paraffin or wax or wax-like substances, characterised in that, as the photo-initiators, the said overall combination is used.

(2) Description of the prior art

German displayed specifications 1,297,269, 1,694,149, 1,902,930 and the Austrian Pat. 286,642 have described moulding compositions and coating compositions of mixtures, stabilised in the usual manner, of unsaturated polyesters, and copolymerisable monomeric compounds, which contain benzoin-ethers and metal accelerators or benzoin-ethers of secondary alcohols and optionally additionally a peroxide catalyst and/or acid esters of phosphoric acid and/or metal accelerators and benzoin-ethers of primary alcohols respectively and copper compounds meaning such copper compounds being described in the U.S. Pats. 3,028,360 and 3,360,589, and benzoin-aryl-ethers respectively.

The known systems can be cured both by the action of high energy radiation from, for example mercury vapor high pressure lamps, and by the action of radiation of less high energy, for example under super-actinic radiation from fluorescent lamps which possess a coating of fluorescent substances which emit blue-violet light and rays in the longer-wavelength UV, for example in the range of 3000 to 5800 A.

When using these benzoin-ethers as sensitisers, it is possible to photopolymerise mixtures of unsaturated polyesters with unsaturated vinyl compounds, such as styrene, at room temperature in a relatively short time.

Here a content of benzoin-ethers of about 2% by weight, relative to the mixture, is necessary to achieve adequate activity. However, after irradiation under mercury vapor high pressure lamps these mixtures show an intense yellow coloration which does not fully disappear again even at the end of several days.

German displayed specification 1,934,637 already discloses unsaturated polyester preparations curable by irradiation which contain an unsaturated polyester with a hydroxyl number of 55 to 75, a copolymerisable monomer, and stabiliser combination of 200 to 800 parts per million of an alkyl phosphite or aryl phosphite and 10 to 50 parts per million of a copper salt of organic acids; in addition, 0.1 to 5% of benzoin or of a benzoin substituted in α-position by a $C_1$–$C_8$ alkyl radical are used as a photo-initiator. Curing takes place by irradiation with light of wavelengths 2500 to 4000 A. These polyester preparations show improved storage stability in the dark, but do not show a shortened curing time relative to comparable photopolymerizable polyester preparations stabilised in other ways.

It is the task of the present invention to improve unsaturated polyester preparations which are curable by UV irradiation in at least four directions conjointly relative to the state of the art, namely:

(1) To improve, quite considerably, the dark storage stability at room temperature and at elevated temperatures up to about 60° C.

(2) To increase the polymerisation speed quite considerably, so that the UV-radiation time can be correspondingly shortened.

(3) To reduce the discoloration of the cured polyester preparation by reducing the sensitiser concentration used, whilst having a relatively short irradiation time.

(4) To obtain a non-tacky surface when light-curing such air-drying polyester resins that contain proportional amounts of $β,γ$-unsaturated ether-alcohols.

These tasks are solved, surprisingly, through benzoin-ethers in certain combinations with compounds of trivalent phosphorus being contained in the unsaturated polyester preparation.

SUMMARY OF THE INVENTION

When employing the overall combination consisting of (a) and (b) ((b') and (b")), a synergistic effect surprisingly manifests itself, which causes extremely short polymerisation times on UV irradiation.

The extraordinary high reactivity of the preparations according to the invention makes it possible to reduce the content of benzoin-ethers considerably relative to the known preparations, for comparable curing times, or alternatively considerably to shorten the curing times for comparable content of benzoin-ethers.

The high reactivity of the preparations according to the invention permits rapid curing of thin layers, in particular also under the action of ultra-violet and visible radiation of comparatively low energy fluorescent lamps with an emission of about 3000 to 5800 A.; this is particularly advantageous when photo-curing coatings based on unsaturated polyester resins.

By unsaturated polyester resins, there are understood the customary condensation products (compare Johan Bjorksten, "Polyesters and Their Applications," Reinhold Publishing Corporation, New York, 1956, pp. 21–155), which are obtained by polycondensation from $α,β$-unsaturated dicarboxylic acids and/or their anhydrides with polyhydric alcohols employed in a molar excess. As $α,β$-unsaturated dicarboxylic acids it is for example possible to use: Maleic acid, maleic anhydride, fumaric, itaconic, citraconic, mesaconic and aconitic acid, and halogenated acids, such as for example chloromaleic acid.

A part of the $α,β$-unsaturated dicarboxylic acids can here be replaced, in a manner which is in itself known, by saturated dicarboxylic acids, for example o-phthalic, isophthalic and terephthalic acid, tetrahydrophthalic and hexahydrophthalic acid, tetrachlorophthalic acid, hexachlorendomethylene-tetrahydrophthalic acid, endomethylene-tetrahydrophthalic acid, adipic and sebacic acid and dimerised linoleic acid and soya oil fatty acid or their anhydrides.

Possible polyhydric alcohols are preferably dihydric alcohols, for example ethylene glycol, propanediol-1,2, butanediol-1,3, butanediol-1,4, diethylene glycol, dipropylene glycol and their higher homologues, neopentylglycol, 2,2,4-trimethylpentanediol-1,3, pentylglycol, hydroxyalkylated bisphenols, hydrogenated bisphenol, and dimethylolcyclohexane. However, trihydric and polyhydric alcohols, such as glycerol, trimethylolethane, trimethylolpropane and pentaerythritol can also be conjointly used as a constituent.

The unsaturated polyester resins built up from these raw materials are known to suffer from the disadvantage of forming a tacky surface on curing in the presence of atmospheric oxygen. If value is attached to air-drying properties of the polyester resin, $α,β$-unsaturated ether-alcohols must be conjointly used as a replacement for the polyhydric alcohols, as described in the German displayed specification 1,024,654 and in the U.S. Pat. 2,852,487. As examples, there may be mentioned: The monoallyl-ether and monomethallyl-ether of ethylene glycol, of propanediol-1,2, of butanediol-1,3 and butanediol-1,4, of glycerol, of trimethylolpropane and trimethylolethane, and of pentaerythritol, as well as diallyl-ethers and the corresponding methallyl-ethers of glycerol and of trimethylolethane, of trimethylolpropane and of pentaerythritol. Here, those $α,β$-unsaturated ether-alcohols can especially be used which contain at least two $α,β$-unsaturated ether groups, such as trimethylolpropane-diallyl-ether, trimethylolethane-diallyl-ether and pentaerythritol-triallyl-ether.

Suitable copolymerisable vinyl compounds that are present individually or in mixture in amounts of 20 to 45% by weight relative to the mixture of unsaturated polyester resin and copolymerizable monomers (compare for example: Bulletin IP8, July 1961, Amoco Chemical Corporation, with title "The Effect of Resin Ingredients on the Properties of Isophthalic Unsaturated Polyesters," pp. 5–19), are, for example styrene, vinyltoluene p-tert.-butylstyrene, divinylbenzene, vinylacetate, vinylpropionate, acrylic acid esters, methacrylic acid esters, methyl acrylate, ethyl acrylate, n-butyl acrylate, 2-ethylhexyl acrylate, methyl methacrylate, ethylene glycol dimethacrylate and its higher homologues, diethylene glycol dimethacrylate and triethylene glycol dimethacrylate. As allyl compounds, it is for example possible to use: Diallyl phthalate, diallyl maleate, diallyl fumarate, triallyl cyanurate.

The moulding, impregnating and coating compositions are stabilised by adding customary inhibitors, for example p-benzoquinone, 2,5-di-tert.-butylbenzoquinone, hydroquinone, tert.-butyl-pyrocatechol or toluylhydroquinone, further on copper compounds, for example copper naphthenate, in the known amounts as described for example, in the book Kirk-Othmer Encyclopedia of Chemical Technology, Interscience Publishers, New York, 1969, second edition, vol. 20, pp. 822–825.

Examples for the sensitisers (a) to be used in the overall combination (a) and (b) ((b') and (b")) are the benzoin-ethers of the following alcohols: Methanol, ethanol, propanol-1, propanol-2, butanol-2, pentanol-2, cyclohexanol, n-butanol, iso-butanol, 2-methyl-1-pentanol, 2-methylpentanol-3, primary and secondary octanol, 2-ethylhexanol, n-nonanol, n-dodecanol, 6-dodecanol, lauryl alcohol, myristyl alcohol, stearyl alcohol, 2-chloropropanol-1, 3-bromopropanol-1, 2,2-dichloropropanol-1, 1-chloropropanol-2, abietyl alcohol and tetrahydroabietyl alcohol. Amongst the mono-alcohols with an ether-like bond, those compounds which possess primary alcoholic hydroxyl groups are preferred. However, the mono-alcohols with secondary and tertiary alcoholic hydroxyl groups can also be used. In addition to the saturated alcohols, the unsaturated alcohols are also suitable. Individually, the following examples may be mentioned: α,β-unsaturated alcohols, such as allyl alcohol, methallyl alcohol, ethallyl alcohol, chlorallyl alcohol, crotyl alcohol, phenylallyl alcohol, methylvinylcarbinol, and the unsaturated fatty alcohols which are obtained by selective hydrogenation of unsaturated fatty acids.

Examples for benzoinarylethers (a) used for the overall combination (a) and (b) ((b') and (b")) are the benzoin-ethers of benzophenol, 2-cresol, 3-cresol, 4-cresol, 3,4-dimethylphenol, 2,6-diethylphenyl, 4-tert.-butylphenol, 2 - methoxyphenol, 4 - methoxyphenol, 2 - chlorophenol, 4-chlorophenol, 2,6-dichlorophenol, 2,4,6-trichlorophenol, naphthol-1, naphthol-2 and 2,2-bis-(4-hydroxyphenyl)-propane (bisphenol A).

The preparations according to the invention contain the benzoin-ethers (a) which have been mentioned, individually or mixed with one another, in amounts of 0.1 to about 4% by weight, perferably 0.1 to about 1.5% by weight, in combination with compounds of trivalent phosphorus (b) ((b') and (b")).

Possible esters of phosphorous acid (b'), which contain at least one aromatic radical, are triphenyl phosphite, tri-p-toluyl phosphite, tri-nonylphenyl phosphite and didecylphenyl phosphite.

Possible organic derivatives of phosphine (b") which contain at least one aromatic radical are for example:

triphenylphosphine,
tri-p-toluyl-phosphine,
diphenylmethyl-phosphine,
diphenyl-ethyl-phosphine,
diphenylpropyl-phosphine,
dimethyl-phenyl-phosphine,
diethylphenyl-phosphine,
dipropyl-phenyl-phosphine,
divinylphenyl-phosphine,
divinyl-p-methoxyphenyl-phosphine,
divinyl-p-bromophenyl-phosphine,
divinyl-p-toluyl-phosphine,
diallyl-phenyl-phosphine,
diallyl-p-methoxyphenyl-phosphine,
diallyl-p-bromophenyl-phosphine and
diallyl-p-toluyl-phosphine.

The esters of phosphorous acid (b') are present in amounts of 0.1 to 20% by weight, relative to the total weight of unsaturated polyester resin and copolymerisable monomers, preferably 0.1 to 2% by weight, in the mixture with the benzoin-ethers (a) and phosphines (b") which have been mentioned.

The phosphines (b") which have been mentioned are contained in amounts of 0.05 to 2% by weight, relative to the total weight of unsaturated polyester resin and copolymerisable monomers, in the mixture with the said benzoin-ethers (a) and esters of phosphorous acid (b').

DESCRIPTION OF THE PREFERRED EMBODIMENTS

The most preferred overall combinations consist of: benzoin-ethers of primary alcohols (a), esters of phosphorous acid (b') which only contain aromatic radicals, such as, for example triphenyl phosphite and/or tri-p-toluyl phosphite, and organic derivatives of phosphine (b"), which only contain aromatic radicals, such as for example triphenyl-phosphine and/or tri-p-toluylphosphine.

At times, the conjoint use of customary polymerisation initiators (compare, for example, Johan Bjorksten, "Polyesters and Their Applications," Reinhold Publishing Corporation, New York, 1956, pp. 48–51) in amounts of 0.1 to about 2% by weight, relative to the total weight of unsaturated polyester resin and copolymerisable monomers, can be advantageous, since the latter can stimulate polymerisation catalysis by the UV radiation itself as well as by the heat produced by the UV radiation. Suitable polymerisation initiators are, for example, tert.-butyl perbenzoate, dicumyl peroxide, benzoyl peroxide, lauroyl peroxide, methyl-ethyl-ketone peroxide, methyl-isobutyl-ketone peroxide, cyclohexanone peroxide, and azobisiso-butyronitrile.

The addition of peroxides can in some cases result in a better adhesion of the coatings to the base. Further on the conjoint use of peroxides namely methylethylketone-peroxide, seems advisable in all those cases in which the insignificant discoloring of the cured products that can appear during irradiating or in some cases during storage is wanted to be reduced. A conjoint use of small amounts of customary accelerators as, for example cobalt octoate, cobalt naphthenate, zirconium naphthenate, dimethylanilin acetoacetic acid ester, is also possible. The application of accelerators for copolymerizing unsaturated polyester resins and copolymerizable monomers has been described, for example in the book Kirk-Othmer, Encyclopedia of Chemical Technology, Interscience Publishing, New York, 1969, second edition, vol. 20, pp. 825–826.

Additional to the application of ketone peroxides metal compounds, such as cobalt-, zirconium- and vanadium-naphthenate, or metal chelates, such as cobalt- and zirconiumacetylacetonate, can be added.

If peroxides and metal accelerators are present simultaneously the storage stability of the compositions is rather lowered.

The conjoint use of small amounts of customary accelerators, for example cobalt octoate, cobalt naphthenate, zirconium naphthenate, dimethylaniline, or ethyl acetoacetate, is also possible.

The addition of UV-absorbers as light stabilisers for the cured preparations, such as derivatives of hydroxybenzophenone, of salicylic acid esters or of o-hydroxyphenyl-bentriazole, in the customary amounts of between 0.01 to 0.4% by weight, does not cause any significant or still tolerable retardation of the photopolymerisation, though the absorption of the UV-absorbers lies in the region of the long-wavelength UV radiation required for the photopolymerisation.

These moulding, impregnating and coating compositions according to the invention possess, in comparison to the known compositions, excellent storage stability in the dark and are therefore outstandingly suitable for use as stable single-component systems.

The best results are obtained by keeping a phosphite/phosphine ratio of about 3:1.

To test the storage stability in the dark of the preparations according to the invention 61 parts by weight of an unsaturated polyester resin from 1 mol of maleic anhydride, 1 mol of phthalic anhydride and 2.18 mols of propanediol-1,2, stabilised in the customary manner with 0.015% by weight of hydroquinone, were mixed with 39 parts by weight of styrene and mixed, in accordance with the following table, with various overall combinations of (a) benzoin-ethyl-ether, (b') triphenyl phosphite and (b") triphenylphosphine dissolved in styrene.

TABLE 1.—STORAGE STABILITY IN THE DARK

| Benzoin-ethyl ether [1] | Triphenyl-phosphite [1] | Triphenyl-phosphine [1] | Storage stability in the dark (60°) in days |
|---|---|---|---|
| 0.25 | 0.2 | 0.1 | 24 |
| 0.5 | 0.2 | 0.1 | 24 |
| 0.5 | 0.4 | 0.1 | 24 |
| 0.5 | 0.6 | 0.2 | 22 |

[1] In parts by weight, relative to 110 parts by weight of mixture.

The moulding, impregnating and coating compositions according to the invention are outstandingly suitable for the manufacture of high quality lacquerings on the most diverse substrates, such as timber, timber-like materials and metals, and for the production of fibre-reinforced plastics articles. When used in the lacquer field, the preparations can be employed unpigmented or filled and/ or pigmented, whereby only such pigments may be used that have a sufficient UV-transparence. In the process using unpigmented preparations for the production of closed-pore or open-pore timber polishing lacquers, a combined curing process is advantageous. According to this process, the coating is allowed to pre-gel under the action of fluorescent lamps of comparatively low energy, whereupon a uniform paraffin skin or wax skin forms if paraffin-containing polyester resins are used. The final curing can then take place alternatively either through irradiation with mercury vapor high pressure lamps or application of heat or by conventional curing process; in the latter case, the preparations according to the invention additionally contain a customary accelerator, such as for example cobalt octoate, and are applied to a substrate which is already provided with an "active primer" (Hauck, K. H., in the journal "Holz" ("Timber"), 10, 28–31 (February 1956)).

In the filled or pigmented state, the preparations according to the invention are outstandingly suitable for the manufacture of filling compositions, especially so-called roller filling compositions, which serve to smooth rough, porous substrates, such as chipboards. Suitable fillers for the manufacture of such filling compositions are naturally only those products which possess adequate UV transmission. Asbestos, talc, calcium sulphate, mica, ground gypsum (calcium sulphate), barium sulphate and highly disperse silica for example represent suitable fillers. So-called transparent pigments or soluble dyestuffs can be used for coloring purposes.

For the manufacture of fibre-reinforced, especially glass fibre-reinforced, plastics articles using the preparations according to the invention, only those processes are of course suitable which permit an irradiation after shaping or after the laminating process. As examples there may be mentioned: The hand lay-up process, the lining of containers and pipes and the two-sided coating of chipboard and blockboard or plywood with glass fibre-reinforced laminates in order to manufacture so-called container sheets. Suitable reinforcing materials are all customary glass fibre products, such as mats, rovings and varieties of woven fabrics. After carrying out the laminating process, which is not tied in the usual way to a restricted processing time or "pot life," the laminate can be cured by low energy UV radiation over a longer period of time or with the aid of mercury vapor high pressure lamps over a short period of time.

Because of their very short curing time, the compositions of this invention lend themselves to a streamlined method of processing adapted to the moving belt method.

MIXTURE A 100 parts by weight of a polymerisable mixture consisting of 67 parts by weight of polyester resin (manufactured from 1 mol of maleic anhydride, 1 mol of phthalic anhydride and 2.18 mols of propanediol-1,2) and 33 parts by weight of styrene, stabilised with 0.015% by weight of hydroquinone, and having a viscosity of approx. 1500 cp. at 20° C. and an acid number of 28, are diluted with a further 10 parts by weight of styrene and mixed with 0.5 part by weight of a 10% strength by weight solution of paraffin (melting point 52–53° C.) in toluene, in order to manufacture a coating composition.

MIXTURE B 100 parts by weight of a polymerisable mixture consisting of 67 parts by weight of polyester resin (manufactured from 2 mols of maleic anhydride, 1 mol of phthalic anhydride and 3.08 mols of propanediol-1,2) and 33 parts by weight of styrene, stabilised with 0.014% by weight of hydroquinone, and having a viscosity of approx. 1100 cp. at 20° C. and an acid number of 30, are diluted with a further 10 parts by weight of styrene and with 0.5 part by weight of a 10% strength by weight solution of paraffin (melting point 52–53° C.) in toluene, in order to manufacture a coating composition.

COMPARISON TESTS 1–31

Various benzoin-ethers and esters of phosphorous acid, or various benzoin-ethers and triphenylphosphine, are added to mixture A in the concentrations indicated in Table 2. The solutions thus obtained are cast in an approx. 1 mm. thick layer onto a glass plate and irradiated with the radiation from a UV lamp (El-Vak, Luminotest, Elektro-Vakuum-GmbH, Berlin) at a distance of 17 cm. The gelling times are indicated in Table 2. By way of comparison, the gelling times of the mixtures free of phosphite and of the mixture free of phosphine, under the same conditions, are also given.

TABLE 2

| Experiment number | Benzoin-ether added [1] | Phosphite added [1] | Triphenyl-phosphine [1] | Gelling time in seconds |
|---|---|---|---|---|
| 1 | 0.5 benzoinmethyl ether | | | 55 |
| 2 | do | 0.6 triphenyl phosphite | | 45 |
| 3 | do | 0.8 triphenyl phosphite | | 45 |
| 4 | do | 1.0 triphenyl phosphite | | 40 |
| 5 | 1.0 benzoinmethyl ether | | | 35 |
| 6 | do | 0.6 triphenyl phosphite | | 32 |
| 7 | do | 0.8 triphenyl phosphite | | 30 |
| 8 | do | 1.0 triphenyl phosphite | | 30 |
| 9 | 0.5 benzoinethyl ether | | | 55 |
| 10 | do | 0.6 triphenyl phosphite | | 45 |
| 11 | do | 0.8 triphenyl phosphite | | 43 |
| 12 | do | 1.0 triphenyl phosphite | | 45 |
| 13 | do | 5.0 triphenyl phosphite | | 37 |
| 14 | do | 10.0 triphenyl phosphite | | 29 |
| 15 | do | 20.0 triphenyl phosphite | | 32 |
| 16 | do | 0.6 trisnonylphenyl-phosphite | | 50 |
| 17 | 0.5 benzoinmethyl ether | | 0.2 | 18 |
| 18 | do | | 0.6 | 15 |
| 19 | do | | 1.0 | 15 |
| 20 | 1.0 benzoinmethyl ether | | 0.2 | 12 |
| 21 | do | | 0.6 | 10 |
| 22 | do | | 1.0 | 8 |
| 23 | 0.25 benzoinethyl ether | | 0.2 | 40 |
| 24 | do | | 0.6 | 25 |
| 25 | do | | 1.0 | 20 |
| 26 | 0.5 benzoinethyl ether | | 0.2 | 30 |
| 27 | do | | 0.6 | 20 |
| 28 | do | | 1.0 | 15 |
| 29 | 1.0 benzoinethyl ether | | 0.2 | 18 |
| 30 | do | | 0.6 | 12 |
| 31 | do | | 1.0 | 9 |

[1] In parts by weight, relative to 110 parts by weight of mixture A.

COMPARISON EXPERIMENTS 32-34

Benzoin-ethyl-ether and triphenyl phosphite or benzoin-ethyl-ether and triphenylphosphine are added to mixture B in the concentrations indicated in Table 3. Using the same conditions as indicated in comparison tests 1-31, the gelling times indicated in Table 3 are achieved.

TABLE 3

| Experiment No. | Benzoin-ethylether [1] | Triphenyl phosphite [1] | Triphenyl phosphine [1] | Gelling time in seconds |
|---|---|---|---|---|
| 32 | 0.5 | | | 45 |
| 33 | 0.5 | 0.6 | | 30 |
| 34 | 0.5 | | 0.2 | 14 |

[1] In parts by weight, relative to 110 parts by weight of mixture B.

As indicated in Table 2, tests 2 to 4, 6 to 8, 10 to 16 and in Table 3, test 33, the addition of 0.6 to 20% by weight phosphites relative to 110 parts by weight of mixture A, respectively 110 parts by weight of mixture B, causes a decrease of the gelling time during UV irradiation. An addition of triphenylphosphine according to Table 2, tests 17 to 31, respectively Table 3, test 34, causes a substantial decrease of the gelling time during UV irradiation, but the storage stability in the dark is also rather deteriorated.

As can be seen in Table 1 the gelling time can be shortened surprisingly by the use of the overall combination according to the invention as well as the storage stability in the dark can be improved.

The addition of the ingredients of the overall combination, namely benzoin-ethers (a), phosphite compounds (b') and phosphine compounds (b"), can be ensured in any order.

In the most preferred order first the phosphite compound (b') then the phosphine compound (b") and last the benzoin-ether compound (a) is added.

But it is substantial that the named ingredients (a), (b') and (b") are contained in the polyester preparation as a combination before starting the UV irradiation.

In order that those skilled in the art can more fully understand the present invention, the following examples are set forth. The examples are given solely for the purpose of illustrating the invention, and should not be considered as expressing limitations unless so set forth in the appended claims. All parts and percentages are by weight, unless otherwise stated.

EXAMPLES 1-11

Various benzoin-ethers (a), triphenyl phosphite (b') and triphenyl phosphine (b"), in the concentrations indicated in Table 4, are added to the mixture A which has been indicated. Under the same light exposure conditions as indicated in comparison tests 1-31, the gelling times indicated in Table 4 are achieved.

TABLE 4

| Example No. | Sensitiser added [1] | Triphenyl phosphite added [1] | Triphenyl phosphine added [1] | Gelling time in seconds |
|---|---|---|---|---|
| 1 | 0.25 benzoinemethylether | 0.2 | 0.1 | 45 |
| 2 | 0.25 benzoinmethylether | 0.2 | 0.2 | 30 |
| 3 | 0.5 benzoinmethylether | 0.2 | 0.1 | 30 |
| 4 | 0.5 benzoinmethylether | 0.4 | 0.2 | 10 |
| 5 | 0.25 benzoinethylether | 0.2 | 0.1 | 30 |
| 6 | 0.25 benzoinethylether | 0.4 | 0.2 | 25 |
| 7 | 0.5 benzoinethylether | 0.2 | 0.1 | 16 |
| 8 | do | 0.4 | 0.1 | 15 |
| 9 | do | 0.4 | 0.2 | 10 |
| 10 | do | 0.6 | 0.2 | 9 |
| 11 | 1.0 benzoinethylether | 0.4 | 0.4 | 5 |

[1] See footnote (1) at bottom of Table 2.

EXAMPLES 12-13

Benzoin-ethyl-ether (a), triphenyl phosphite (b') and triphenylphosphine (b"), in the concentrations indicated in Table 5, are added to the mixture B which has been indicated. Under the same light exposure conditions as indicated in comparison tests 1-21, the gelling times indicated in Table 5 are achieved.

TABLE 5

| Example No. | Benzoin-ethylether [1] | Triphenyl-phosphite added [1] | Triphenyl-phosphine added [1] | Gelling time in seconds |
|---|---|---|---|---|
| 12 | 0.5 | 0.2 | 0.1 | 17 |
| 13 | 0.5 | 0.6 | 0.2 | 12 |

[1] See footnote (1) at bottom of Table 3.

From the gelling times indicated in Table 4 and Table 5 the described synergistic effect can be derived which appears when the overall combination (a) and (b) ((b') and (b")) is being used.

This is extremely surprising so far as the esters of the phosphorous acid during conventional curing of unsaturated polyester resins and copolymerizable monomer compounds by peroxides are known to be strong inhibitors already in small amounts.

EXAMPLES 14-20

0.5 part by weight of benzoin-ethyl-ether (a), 0.6 part by weight of triphenyl phosphite (b') and 0.2 part by weight of triphenylphosphine (b"), and additionally various conventional polymerisation initiators or accelerators, in the concentrations indicated in Table 6, are added to the mixture A which has been indicated. Under the same light exposure conditions as indicated for comparison tests 1-31, the gelling times indicated in Table 6 are achieved.

TABLE 6

| Example No. | Additives in parts by weight, relative to 110 parts by weight of mixture A | Gelling time in seconds |
|---|---|---|
| 14 | 2 methyl-ethyl-ketone peroxide (50% by weight) | 35 |
| 15 | 1 benzoyl peroxide paste (50% by weight) | 18 |
| 16 | 1 cobalt octoate (6% by weight of Co) | 23 |
| 17 | 1 zirconium octoate (6% by weight of Zr) | 39 |
| 18 | 2 azobisisobutyronitrile | 16 |
| 19 | 1 ethyl acetoacetate | 16 |
| 20 | 2 dimethylaniline (10% by weight solution) | 31 |

EXAMPLE 21

1.5 parts by weight of benzoin-ethyl-ether (a), 0.6 part by weight of triphenyl phosphite (b') and 0.2 part by weight of triphenylphosphine (b") are added to 90 parts by weight of the mixture B yet without addition of paraffin which has been indicated.

In order to manufacture a roller filling composition, 15 parts by weight of monostyrene, 50 parts by weight of talc, 25 parts by weight of blanc fix (barium sulphate), 80 parts by weight of ground gypsum (calcium sulphate) and 1 part by weight of highly disperse silica (Aerosil 380) are worked into this preparation, which is applied to a chipboard at a coating thickness of 250μ. After an irradiation time of 30 seconds in a UV light curing tunnel (Messrs. Behnke KG, Hamburg), the roller filling composition has cured and can, after cooling to room temperature, be rubbed down without clogging of the wet emery paper of grade 400 which is used.

The UV light curing channel is equipped with a high pressure burner and two HTQ7 mercury vapor high pressure lamps (length of each 755 mm., diameter 12 mm., spaced at 15 cm. from one another) of Messrs. Philips. Cooling is by air, and the irradiation distance is 20 cm.

EXAMPLE 22

1.5 parts by weight of benzoin-ethyl-ether (a), 0.6 part by weight of triphenyl phosphite (b') and 0.2 part by weight of triphenylphosphine (b") are added to 110 parts by weight of the mixture A which has been indicated, but without the addition of paraffin. Two glass fibre mats with a customary soluble synthetic resin binder based on polyester, and a weight per unit area of 450 g./m.², are successively laminated, using this preparation, onto a sheet of plywood, in accordance with the hand lay-up proces. After having impregnated the mats with the above-mentioned preparation, the laminate is covered with a transparent film which contains a release agent on the surface, and is irradiated for 150 seconds under the mercury vapor high pressure lamps described in Example 21. After cooling to room temperature, the film can be pulled off. A firmly adhering glass fibre-reinforced coating of the plywood sheet is thus obtained.

The obtained coating shows excellent transparence so that the natural structure of the plywood surface takes extraordinary effect.

It has been found in a surprising manner that a such produced coating shows essentially better mechanical properties, especially improved bending, impact and tensile strength, than a comparably produced coating having been cured by application of a conventional curing process using peroxides as polymerization initiators and accelerators. Moreover it has been found that the content of not yet copolymerized monomers in the photo-polymerized polyester resin is essentially lower immediately after performing the photo-polymerization than directly after performing the polymerization in the usual manner by the use of peroxides as polymerization initiators and accelerators.

EXAMPLE 23

An air-drying unsaturated polyester resin is manufactured in a known manner by condensation of 306 g. of fumaric acid, 133 g. of tetrahydrophthalic anhydride, 368 g. of diglycol and 113 g. of pentaerythritol-triallyl-ether in the presence of 0.3 g. of hydroquinone. The mixture of 65 parts by weight of this polyester resin and 35 parts by weight of styrene has a viscosity of approx. 700 cp. at 20° C. and an acid number of 25.

To manufacture a lacquer solution, 10 parts by weight of styrene, 1.5 parts by weight of benzoin-ethyl-ether (a), 0.6 part by weight of triphenyl phosphite (b') and 0.2 part by weight of triphenylphosphine (b'') are added to 100 parts by weight of this mixture. When applied to a glass plate at a film thickness of 100μ, and after a period of irradiation of 30 seconds under the mercury vapor high pressure lamps described in Example 1, and subsequent cooling to room temperature, this lacquer solution yields a non-tacky, highly glossy film.

The above result is surprising because an appropriate mix free of phosphite and free of phosphine has only very unsatisfactory storage stability in the dark especially at higher temperatures up to about 60° C., and it does not gel under UV-irradiation conditions described in comparison tests 1 to 31 even after irradiation times of about 120 seconds.

EXAMPLES 24–31

The procedure of Example 10 is followed, but adding 5 parts by weight of further copolymerisable vinyl compounds, as indicated in Table 7, and 1.5 parts by weight of benzoin-isopropyl-ether instead of the benzoin-ethyl-ether (parts by weight relative to 110 parts by weight of mixture A).

TABLE 7

| Example No. | Copolymerisable vinyl compounds | Gelling time in seconds |
| --- | --- | --- |
| 24 | Methyl methacrylate | 20 |
| 25 | Isobutyl methacrylate | 17 |
| 26 | Butyl methacrylate | 17 |
| 27 | Butanediol 1,4-dimethacrylate | 23 |
| 28 | Triethylene glycol dimethacrylate | 17 |
| 29 | Vinyltoluene | 18 |
| 30 | Chlorostyrene | 16 |
| 31 | p-Tert.-butylstyrene | 18 |

By the conjoint proportional use of methyl-methacrylate according to Example 24 the index of refraction of the cured coating is reduced and is herewith adjusted to the index of refraction of the glass silk reinforcement so that transparent glass silk reinforced coatings are obtained.

By the conjoint use of butanediol-1,4-dimethylacrylate and triethyleneglycoldimethacrylate respectively, according to Examples 27 and 28 the cross-linking density is increased so that cured films having better solvent resistance are obtained.

The conjoint use of p-tert.-butylstyrene according to Example 31 gives a decreased polymerization shrinkage and herewith an improved bond strength of the cured coatings.

EXAMPLE 32

110 parts by weight of the mentioned mixture B yet without addition of paraffin, are admixed with 1.5 parts by weight of benzoin butylether (a), 0.6 part by weight of triphenylphosphite (b') and 0.2 part by weight of triphenylphosphine (b''). This mixture is applicated to a cleaned and ground sapelli mahogany plywood using an amount of 80 g./m.$^2$ and it is irradiated 30 seconds under the conditions described in Example 21.

On top of this UV priming a polyester coating lacquer made of 110 parts by weight of mixture B (with addition of paraffin), 1.5 parts by weight of benzoin-ethyl-ether (a), 0.6 part by weight of triphenylphosphite (b') and 0.2 part by weight of triphenylphosphine (b''), 0.75 part by weight Aerosil (HDK, Type V15), 0.3 part by weight silicon fluid PL (1% by weight solution in toluene) and 30 parts by weight butylacetate is being applied in a wet film thickness of about 300μ and it is irradiated by superactinic fluorescent lamps (Philips, TL-M 120 W/05 RS) at a distance of 20 cm. after an exposure to air of 30 minutes.

The endcuring takes place within 30 seconds in the UV-light curing tunnel as described in Example 21 after the flooding of the wax. Having been cooled to room temperature the coating is ground and mop-polished.

A highly glossy lacquering is obtained having excellent filling properties and an outstanding adhesion to the substratum.

EXAMPLE 33

By condensing 750 g. propanediol-1,2, 587 g. maleic anhydride and 578 g. tetrachlorophthalic anhydride an unsaturated self-extinguishable polyester resin is produced in a known manner and stabilized using 136 mg. hydroquinone and 68 mg. p-tert.-butylpyrocatechol.

A mixture containing 65 parts by weight of the above polyester resin and 25 parts by weight styrene and 10 parts by weight trichloroethylphosphite shows a viscosity of 1400 cp. at 20° C. and an acid number of 28.

100 parts by weight of this mixture are admixed with 1.5 parts by weight benzoinpropylether (a), 0.6 part by weight triphenylphosphite (b') and 0.2 part by weight triphenylphosphine (b''). Using this composition two glass-fibre mats with a customary synthetic resin binder based on polyester and having a weight per unit area of 450 g./m.$^2$ are laminated successively onto a polished aluminum sheet the surface of which is supplied with a release agent. After the mats are impregnated by the above described composition the laminate is covered by a transparent sheet the surface of which is supplied with a release agent and then the laminate is exposed to the mercury vapor high pressure lamps for 150 seconds as being described in Example 21.

After cooling to room temperature the sheet can be pulled off and the laminate can be separated from the aluminum plate. By this manner a flame resistant and self-extinguishable, glass fibre-reinforced, plate is obtained having good transparence.

EXAMPLES 34–37

100 parts by weight of a polymerisable mixture consisting of 67 parts by weight of polyester resin (manufactured from 2 mols of maleic anhydride, 1 mol of phthalic anhydride and 3.08 mols of propanediol-1,2) and 33 parts by weight of styrene, stabilised with 0.014% by weight of hydroquinone, and having a viscosity of approx. 1100 cp. at 20° C. and an acid number of 30, are diluted with a further 10 parts by weight of styrene and with 0.5 part by weight of a 10% strength by weight solution of paraffin (melting point 52–53° C.) in toluene, in order to manufacture a coating composition.

Benzoinphenylether (a), triphenylphosphite (b') and triphenylphosphine (b'') are added to this mixture in the concentrations indicated in Table 8. These solutions are poured on a glass-plate giving a layer about 1 mm. thick and were exposed to the irradiation of a UV lamp (El-Vak, Luminotest, Elektro-Vakuum-GmbH, Berlin) at a distance of 17 cm. The gelling times are indicated in Table 8.

The gelling times that have been ascertained under same conditions of the mixture free of phosphites and free of phosphines are indicated additionally for comparison.

TABLE 8

| Example No. | Sensitiser added [1] | Triphenyl phosphite added [1] | Triphenyl phosphine added [1] | Gelling time in seconds |
|---|---|---|---|---|
| 34 | 1.5 benzoinphenylether | 0.6 | 0.2 | 54 |
| 35 | do | 0.3 | 0.1 | 64 |
| 36 | 0.75 benzoinphenylether | 0.6 | 0.2 | 60 |
| 37 | do | 0.3 | 0.1 | 69 |
| Comparison | 1.5 benzoinphenylether | | | 110 |
| Do | 0.75 benzoinphenylether | | | 125 |

[1] See footnote ([1]) at bottom of Table 1.

A mixture according to Example 34 was applied to a glass plate in a layer 400μ thick and was then exposed to irradiation of a superactinic fluorescent lamp (Philips TL–M 120 W/05 RS) until the film gelled. After an additionnal exposure time of 45 sec. in a UV curing tunnel as described in Example 21 a nearly colorless cured film is obtained after cooling to room temperature.

EXAMPLES 38–40

By condensing 306 g. fumaric acid, 133 g. tetrahydrophthalic anhydride, 368 g. diglycol and 133 g. pentaerythritoltriallylether in the presence of 0.3 g. hydroquinone an air-drying unsaturated polyester resin is produced in the known manner. The mixture of 65 parts by weight of the above polyester resin containing 35 parts by weight of styrene has a viscosity of about 700 cp. at a temperature of 20° C. and an acid number of 25.

In order to manufacture a lacquer solution 100 parts by weight of this mixture are mixed with 10 parts by weight styrene.

Benzoinphenylether (a), triphenylphosphite (b'), and triphenylphosphine (b'') are mixed with the above mixture in the concentrations indicated in Table 9. Exposing to the UV lamp (El-Vak, Luminotest, Elektro-Vakuum-GmbH, Berlin) the gelling times, indicated in Table 9, are obtained.

For comparison the gelling times that have been ascertained under same conditions of the mixture free of phosphites and free of phosphines are indicated additionally.

TABLE 9

| Example No. | Sensitiser added [1] | Triphenyl phosphite added [1] | Triphenyl phosphine added [1] | Gelling time in seconds |
|---|---|---|---|---|
| 38 | 1.5 benzoinphenylether | 0.6 | 0.2 | 15 |
| 39 | do | 0.3 | 0.1 | 20 |
| 40 | 0.75 benzoinphenylether | 0.6 | 0.2 | 17 |
| Comparison | 1.5 benzoinphenylether | | | >180 |
| Do | 0.75 benzoinphenylether | | | >180 |

[1] See footnote ([1]) at bottom of Table 1.

A lacquer solution of Example 38 being applied to a glass plate in a film strength of 100μ gives a non-tacky scratch resistant, highly glossy film, after an exposure time of 30 sec. in a UV light curing tunnel as described in Example 21 and cooling to room temperature.

EXAMPLE 41

A modification of Example 21 is made in that 20 parts by weight of an air-drying polyester resin is admixed additionally with mixture B without addition of paraffin as described in Example 23.

Such a roller filling composition can be abraded much better after curing, even in the hot state.

EXAMPLE 42

A mixture obtained according to Example 34 but by using benzoin-p-tert.-butylphenyl-ether instead of benzoinphenylether was applied to a glass plate in a layer 400μ thick and was then exposed to irradiation of a superactinic fluorescent lamp (Philips TL–M 120 W/05 RS) until the film gelled. After an additional exposure time of 45 sec. in a UV curing tunnel as described in Example 21 a nearly colorless cured film is obtained after cooling to room temperature.

EXAMPLE 43

A mixture obtained according to Example 34 but by using benzoin-o-chloro-phenylether instead of benzoinphenylether was applied to a glass plate in a layer 400μ thick and was then exposed to irradiation of a superactinic fluorescent lamp (Philips TL–M 120 W/05 RS) until the film gelled. After an additional exposure time of 45 sec. in a UV curing tunnel as described in Example 21 a nearly colorless cured film is obtained after cooling to room temperature.

EXAMPLE 44

A mixture obtained according to Example 34 but by using benzoin-o-cresylether instead of benzoinphenylether was applied a glass plate in a layer 400μ thick and was then exposed to irradiation of a superactinic fluorescent lamp (Philips TL–M 120 W/05 RS) until the film gelled. After an additional exposure time of 45 sec. in a UV curing tunnel as described in Example 21 a nearly colorless cured film is obtained after cooling to room temperature.

EXAMPLE 45

A modification of Example 32 is made in that tri-p-toluylphosphine is used instead of triphenylphosphine. After curing a highly glossy lacquering is obtained having excellent filling properties and an outstanding adhesion to the substratum.

EXAMPLE 46

A modification of Example 21 is made in that tri-p-toluylphosphite is used instead of triphenylphosphite. After curing a filler is obtained that can be abraded excellently.

The employed benzoinarylethers (a) correspond to the overall formula

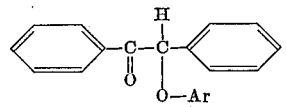

wherein Ar means an aromatic radical.

FURTHER TESTS TO THE ADVANCE IN THE ART

Test series A

A laminate was produced from the coating composition C having a portion of 40% by weight of glass silk fabric and was light polymerized.

From the obtained light polymerized laminate the bending strength, the tensile strength and the impact resistance were determined.

The following results were received:

Bending strength, DIN 53452 _____ kp./cm.² __ 3150
Tensile strength, DIN 53455 _____ kp./cm.² __ 2920
Impact resistance, DIN 53453 ____ kp. cm./cm.² __ 95

Test series B

In an analogous manner another light polymerized comparison laminate was produced the coating composition C of which did not contain triphenylphosphite and triphenylphosphine.

The following test values were obtained:

Bending strength, DIN 53452 _____ kp./cm.² __ 3200
Tensile strength, DIN 53455 _____ kp./cm.² __ 1850
Impact resistance, DIN 53453 ____ kp. cm./cm.² __ 87

Test series C

Making a third comparison test the coating composition C was used in an analogous manner for the production of a polymerized laminate but without addition of benzoinethylether, triphenylphosphite and triphenylphosphine. The curing of the coating composition C was made by adding 2 parts by weight methylethylketoneperoxide (50% by weight) and 0.8 part by weight cobalt accelerator (1% by weight).

After the cold curing the obtained laminate was tested in the same manner, and the following test values were received:

Bending strength, DIN 53452 _____ kp./cm.² __ 2525
Tensile strength, DIN 53455 _____ kp./cm.² __ 1290
Impact resistance, DIN 53453 ____ kp. cm./cm.² __ 110

Moreover all test plates made of the laminate were tempered at 60° C. for 2 hours whereby they became homogenized.

All mentioned test values are average values of 10 test pieces of each series.

These test values show that the usual classical cold curing process using peroxide and accelerators gives products having low bending strength and low tensile strength and a relatively high impact resistance. The high value of the impact resistance test can probably be derived from the fact that the remaining content of monomers in this laminate being cured in the usual manner is higher than in an unsaturated polyester resin being cured by UV irradiation.

It can be clearly seen that the light curing process using benzoinethers only as photo initiators according to test series B gives considerably improved values of bending strength and impact resistance while the tensile strength is slightly decreased compared to the laminate obtained by the cold curing process according to test series C.

Furtheron these tests show that for light polymerized laminates having the overall combination of benzoinethylether, triphenylphosphite and triphenylphosphine as photo initiator according to test series A very good bending strength and the best tensile strength were obtained. Also the impact resistance is distinctly improved compared to the light polymerized polyester containing only benzoinethylether as photo initiator.

The comparison tests show additionally that by this invention unexpected improvements of the light polymerized laminate can be obtained in various directions.

The coating composition C being used for the above test series was made as follows:

Coating composition C 100 parts by weight of a polymerizable mixture consisting of 67 parts by weight of a polyester resin (produced from 2 moles maleic anhydride, 1 mole phthalic anhydride and 3.08 moles propanediol-(1,2)) and 33 parts by weight styrene stabilized by 0.014% by weight hydroquinone and having a viscosity of 100 cp. at 20° C. and an acid number of 30, are diluted using further 5 parts by weight styrene for the manufacture of an impregnating composition.

For the production of a photo-polymerizable mixture 100 parts by weight of the above mixture, 1.5 parts by weight benzoinethylether, 0.6 part by weight triphenylphosphite and 0.2 part by weight triphenylphosphine are mixed.

In further test series D and E test pieces were produced from a polyester resin (without glass silk reinforcement).

For the manufacture of test plates 100 parts by weight of a polymerizable composition consisting of 67 parts by weight of polyester resin (made of 2 moles maleic anhydride, 1 mole of phthalic anhydride and 3.08 moles propanediol-(1,2)) and 33 parts by weight of styrene stabilized by 0.014% by weight hydroquinone and having a viscosity of about 1100 cp. at 20° C. and an acid number of 30, were produced.

Test series D

Test plate 1.—For the production of a 1 cm. thick test plate 1 the above mentioned polymerizable mixture was supplied with 2 parts by weight methylethylketoneperoxide (50% by weight) and 0.3 part by weight cobalt octoate (1% by weight Co).

The mixture was arranged between 2 aluminum plates the surface of which was covered with a release agent and subsequently cured and tempered at 100° C. for 120 minutes in a drying cabinet. From this plate test bars were cut having the size 120 x 15 x 10 mm.

Test series E

Test plate 2.—For the production of the 1 cm. thick test plate 2 the above polymerizable mixture was mixed with 1.5 parts by weight benzoinethylether, 0.6 part by weight triphenylphosphite and 0.2 part by weight triphenylphosphine. This mixture was then placed between 2 window glass plates (3 mm. thick) and exposed to the noon sun for one hour under a cloudless sky and afterwards additionally post-cured from each side in a UV light curing tunnel under mercury vapour high pressure lamps for 15 minutes.

From this plate test bars were cut in the above mentioned size.

The following table gives the mechanical test values:

TABLE

| | Bending strength DIN 53452, kp./cm.² | Modulus of elasticity DIN 53457, kp./cm.² | Impact resistance DIN 53453, kp. cm./cm.² |
|---|---|---|---|
| Test bars from test plate 1 test series D. | 717 | 27,921 | 3.2 |
| Test bars from test plate 2 test series E. | 839 | 30,253 | 5.1 |

These tests show that the light polymerized polyester resin produced according to this invention (according to test series E) has very distinctly improved values of bending strength, modulus of elasticity and impact resistance compared to a polymerized polyester resin produced by cold curing (according ot test series D). Also these results give unexpected effects not to be foreseen.

It will be obvious to those skilled in the art that other changes and variations can be made in carrying out the present invention without departing from the spirit and scope thereof as defined in the appended claims.

What is claimed is:

1. A method for the production of molded articles, impregnations and coatings from mixtures, curable by UV irradiation and stabilized, of unsaturated polyester resins, which are obtained by polycondensation from $\alpha,\beta$-unsaturated dicarboxylic acids or their anhydrides with polyhydric alcohols employed in a molar excess, and copolymerisable monomeric compounds and photoinitiators by molding, impregnating or coating and subsequently curing by irradiating with radiation of wavelength between 3000 and 5800 A., the improvement comprising employing as the photo-initiator an overall combination consisting of
(a) 0.1 to 4 percent by weight of benzoin-ethers, and
(b) 0.1 to 20 percent by weight of organic esters of phosphorous acid of general formula

(I)

wherein $R_1$, $R_2$ and $R_3$ can be identical or different and represent aliphatic, cycloaliphatic, aromatic, araliphatic or heterocyclic radicals—but one of the radicals $R_1$, $R_2$ or $R_3$ must always be an aromatic radical—and
(c) 0.05 to 2 percent by weight of organic derivatives of phosphine of general formula

(II)

wherein $R_1$, $R_2$ and $R_3$ can be identical or different and represent aliphatic, cycloaliphatic, aromatic, araliphatic or heterocyclic radicals—but one of the radicals $R_1$, $R_2$ or $R_3$ must always be an aromatic radical—and the precentages by weight mentioned relate to the total weight of unsaturated polyester resin and copolymerisable monomers.

2. Method according to claim 1, characterized in that as (a) benzoin ethers of primary or secondary alcohols, individually or mixed, are present.

3. Method according to claim 1, characterized in that the polyester resin present is an air-drying polyester resin which contains built-in residues of $\beta,\gamma$-unsaturated ether-alcohols.

4. Method according to claim 1, characterized in that the benzoin-ethers (a) are present individually or mixed with one another, in amounts of 0.1 to about 1.5% by weight, in combination with compounds of trivalent phosphorus (b) and (c).

5. Method according to claim 1, characterized in that the esters of phosphorous acid (b), containing at least one aromatic radical, which are present are triphenyl phosphite, tri-p-toluyl phosphite, tris-nonyl-phenyl phosphite and didecyl-phenyl phosphite, individually or as a mixture.

6. Method according to claim 1, characterized in that the organic derivatives of phosphine (c), containing at least one aromatic radical, which are present are triphenylphosphine, tri - p - toluyl - phosphine, diphenyl-methyl-phosphine, diphenyl - ethyl - phosphine, diphenyl-propyl-phosphine, dimethyl - phenyl - phosphine, diethyl-phenyl-phosphine, dipropyl - phenyl - phosphine, divinyl-phenyl-phosphine, divinyl-p-methoxy-phenyl phosphine, divinyl-p-bromophenyl-phosphine, divinyl-p-toluyl-phosphine, diallyl-phenyl-phosphine, diallyl - p - methoxyphenyl-phosphine, diallyl-p-bromo - phenyl - phosphine or diallyl-p-toluyl-phosphine, individually or as a mixture.

7. Method according to claim 5, characterized in that the esters of phosphorous acid (b) are present in amounts of 0.1 to 2.0% by weight, relative to the total weight of unsaturated polyester resin and copolymerisable monomers.

8. Method according to claim 1, characterized in that the most preferred overall combinations, consisting of benzoin-ethers of primary or secondary alcohols (a), esters of phosphorous acid (b) which only contain aromatic radicals, such as triphenyl phosphite or tri-p-toluyl phosphite, and organic derivatives of phosphine (c) which only contain aromatic radicals, such as triphenylphosphine or tri-p-toluylphosphine, are present.

9. Method according to claim 1, characterized in that small quantities of customary accelerators are also present.

10. Method according to claim 1, characterized in that UV-absorbers are present as light stabilisers.

11. Method according to claim 1, characterized in that as (a) benzoinarylethers are present having the overall formula

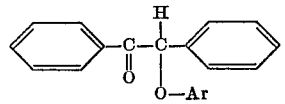

wherein Ar means an aromatic radical.

12. Method according to claim 1, wherein part of the $\alpha,\beta$-unsaturated dicarboxylic acids employed for forming the unsaturated polyester resin is replaced by o-phthalic, isophthalic or terephthalic acid, tetrahydrophthalic or hexahydrophthalic acid, tetrachlorophthalic acid, hexachlorendomethylene-tetrahydrophthalic acid, endomethylene-tetrahydrophthalic acid, adipic or sebacic acid, dimerised linoleic acid or soya oil fatty acid or their anhydrides individually or in mixture.

13. Method according to claim 1, wherein the mixtures of unsaturated polyester resins, copolymerisable monomeric compounds and photo-initiators contain additionally polymerisation initiators, metal accelerators, paraffin, wax or wax-like substances individually or as a mixture.

14. Method according to claim 13, wherein in the presence of paraffin, wax or wax-like substances the curing is carried out in a two-step process by firstly pre-gelling under the action of fluorescent lamps of comparatively low energy and thereafter the final curing is carried out through irradiation with mercury vapor high pressure lamps or by application of heat.

15. Method according to claim 1, wherein the copolymerisable monomeric compounds are selected from the group consisting of styrene, vinyltoluene, p-tert.-butylstyrene, divinylbenzene, vinylacetate, vinylpropionate, acrylic acid esters, methacrylic acid esters, methyl acrylate, ethyl acrylate, n-butyl acrylate, 2-ethylhexyl acrylate, methyl methacrylate, ethylene glycol dimethacrylate and its higher homologues, diethylene glycol dimethacrylate and triethylene glycol dimethacrylate, diallyl phthalate, diallyl maleate, diallyl fumarate and triallyl cyanurate individually or as a mixture.

16. Coatings on timber, timber-like materials and metals when prepared according to the method of claim 1.

17. Impregnations for the manufacture of fiber-reinforced plastic articles when prepared according to the process of claim 1.

18. Moldings when prepared according to the process of claim 1.

19. Molding, impregnating and coating compositions, curable by UV irradiations and stabilized, of unsaturated polyesters resins which are obtained by polycondensation from $\alpha,\beta$-unsaturated dicarboxylic acids or their anhydrides with polyhydric alcohols employed in a molar excess, and copolymerisable monomeric compounds and photo-initiators characterized in that they contain, as the photo-initiator, an overall combination consisting of:
(a) 0.1 to 4 percent by weight of benzoin-ethers, and
(b) 0.1 to 20 percent by weight of organic esters of phosphorous acid of general formula

(I)

wherein $R_1$, $R_2$ and $R_3$ can be identical or different and represent aliphatic, cycloaliphatic, aromatic, araliphatic, or heterocyclic radicals—but one of the radicals $R_1$, $R_2$ or $R_3$ must always be an aromatic radical—and (c) 0.05 to 2 percent by weight of organic derivatives of phosphine of general formula

(II)

wherein $R_1$, $R_2$ and $R_3$ can be identical or different and represent aliphatic, cycloaliphatic, aromatic, araliphatic or heterocyclic radicals—but one of the radicals $R_1$, $R_2$ or $R_3$ must always be an aromatic radical—and the percentages by weight mentioned relate to the total weight of unsaturated polyester resin and copolymerizable monomers.

20. Molding, impregnating and coating compositions according to claim 19, containing additionally polymerisation initiator, metal accelerators, paraffin, wax or wax-like substances, individually or as a mixture.

References Cited

UNITED STATES PATENTS

| | | | |
|---|---|---|---|
| 3,450,612 | 6/1969 | Rudolph | 204—159.23 |
| 3,531,282 | 9/1970 | Miller et al. | 204—159.23 |
| 3,547,633 | 12/1970 | Rust | 204—159.24 |

MURRAY TILLMAN, Primary Examiner

R. B. TURER, Assistant Examiner

U.S. Cl. X.R.

117—13.31, 148; 204—159.23, 159.24